Patented Apr. 6, 1954

2,674,541

UNITED STATES PATENT OFFICE 2,674,541

PIGMENT AND METHOD OF MAKING SAME

Eugene Wainer, Cleveland Heights, Ohio, assignor, by mesne assignments, to Northern Minerals Incorporated, Keeseville, N. Y., a corporation of New York No Drawing. Application May 20, 1949, Serial No. 94,530

4 Claims. (Cl. 106—300)

This invention relates to a new composition of matter useful as a white pigment in paints, lacquers, inks, enamels, paper, rubber, rayon, plastics, and the like. And more particularly, it is concerned with methods of preparation of, and a novel white pigment of high hiding power, and which consists substantially of a composition of co-developed oxides of titanium and silicon, and calcium sulphate.

Probably the most important white pigment manufactured today for the surface finish industry is titanium dioxide. The production of this material or its complexes is measured in many thousands of tons annually. The properties of titanium dioxide which make it particularly useful as a pigment and filler in a large number of applications is the result of its whiteness, its high refractive index, its chemical inertness, its extremely fine particle size, and its ready dispersibility in common vehicles, etc. However, when titanium dioxide of pigment quality is compared with the older white pigments such as white lead, lithopones, zinc oxide and the like from a cost or economic standpoint it is at once evident that titanium dioxide is in the class of a relatively high priced material, having a selling price two to three times that of the aforementioned materials. To a certain extent this adverse selling price is offset by the unusual combination of excellent and useful properties of titanium dioxide. All other things being considered equal, in all probability the most important single characteristic of titanium dioxide is its relatively great hiding power when compared with other white pigments. For example, titanium dioxide has roughly twice the hiding power of zinc sulphide, and about six times the hiding power of white lead, and about four times the hiding power of high strength lithopone. Again, this relative hiding power is the feature possessed by titanium dioxide which enables it to compete with pigments of low cost.

Along the same line, a number of composite titanium pigments have been developed and are now being used on a commercial basis. These pigments consist of coprecipitated or coalesced complexes of titanium dioxide and calcium sulphate or of titanium dioxide and barium sulphate. Such pigments are commonly known in the trade as titanium-calcium or titanium-barium pigments. In such cases the content of titanium dioxide is usually on the order of 25 to 30%. The selling price of such pigments is comparable on a pound basis with that of the usual low cost pigments. However, the most important is the fact that a relative hiding power of the titanium content in such a composite is about 20% higher than the equivalent amount of pure titanium dioxide. For example, the strength of anatase type titanium dioxide is 1275, and of the 30% titanium dioxide-calcium sulphate is 460, which is equivalent to 1530 on a titanium dioxide basis. A similar improvement is available if a rutile type titanium dioxide is the basis for comparison in both cases. Thus, through the use of these complexes two specific advantages are available, first, the selling price is thrown into the range of common pigments, and secondly, an intrinsic improvement is obtained in increased hiding power relative to the titanium dioxide content. Other advantages also accrue which are based primarily on the economics and availability of ore supplies.

I have however in the present invention developed a coalesced or coprecipitated complex pigment containing titanium dioxide which makes possible a very material improvement in hiding power over the prior pigments for instance in the range of 30 to 40% above that available on a titanium dioxide basis alone, and likewise better than the present titanium barium or titanium calcium pigments. For example, titanium dioxide anatase base as indicated above will have a tinting strength of 1275, and titanium calcium pigment anatase containing 30% titanium dioxide has a tinting strength of 460. An equivalent complex prepared in accordance with my invention has a tinting strength of about 560 which represents a very important improvement over the pigments now available. The same type of improvement is made available through the use of rutile pigments.

To the accomplishments of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

My novel white pigments consist of a co-developed co-precipitated complex of oxides of titanium and silicon and calcium sulphate, the silica being in the form comparable to a calcined gel. It is not clear whether there is chemical combination between the components, but it is certain that from the mutual presence of the components and the method of manufacture, a profound effect on the physical properties of each of the components is obtained. It appears that physical forces are present during the formation of the complex which are comparable to a certain extent to the strength of chemical forces. The relative concentrations of these composite pigments may vary within broad limits. The ratio of calcium sulphate to silica is always in the approximate proportion of 1:1 moles or, in other words, an equimolecular proportion, and viz., the Ca and Si are in equimolar proportion. On a weight basis this ratio is equivalent to 136 parts of calcium sulphate to 60 parts of silica. The relative content of titanium dioxide may vary from about 25% of the total weight to about 75% of the total weight.

In the practice of my invention I may use as raw materials for the source of titanium dioxide such starting compounds as ilmenite, basic titanium sulphate, or water soluble titanium disulphate. As starting raw materials for the calcium sulphate and silica portions the most convenient and economical source is the mineral wollastonite which on a chemical basis is substantially pure calcium metasilicate. The reactive agent with respect to this latter compound is sulphuric acid. Under proper conditions calcium silicate or wollastonite decomposes completely into calcium sulphate and silica gel when treated with surphuric acid.

Quite a variety of procedures may be applied for the preparation of the pigment. For example, ilmenite may be dissolved in sulphuric acid, and the solution obtained be reduced with scrap iron. And in a separate container calcium silicate is reacted with sulphuric acid, and the slurry is added to the ilmenite solution. After dilution and prolonged boiling a mixed precipitate of basic titanium sulphate, calcium sulphate and silica gel is formed, which after suitable filtration and washing is calcined at an elevated temperature to develop suitable pigment properties. In this case the proportions of wollastonite in the reactive form may be modified in the range given previously. In a modification of this procedure, the basic titanium sulphate is prepared separately through the use of ilmenite solutions as described above, and is then mixed after removal from the precipitating solution, with the sulphuric acid reacted wollastonite. The product is calcined as before. Again, composition variations between 25 and 75% $TiO_2$ may be used if desired.

In another modification, the basic titanium sulphate is separately prepared as before, removed from the ilmenite solution by filtration, and calcium silicate is added directly so that the conversion to calcium sulphate and silica gel may develop in the presence of the basic sulphate. After filtration and drying the product is again subjected to calcination.

In another modification of this procedure, basic titanium sulphate is mixed with calcium silicate in proportions hereinafter described. After thorough mixing, and without the addition of extra sulphuric acid, the product is calcined directly. Water soluble titanium disulphate may be substituted for the basic titanium sulphate. The advantage of this procedure is that there is no loss of sulphuric acid in the calcination. This is not true of the alternative methods.

The foregoing are generalized descriptions of the method of preparation of this novel pigment. The particle sizes obtained are of the order of 0.5 micron or less. The color is white, and the hiding powers are of the order given above.

In some cases it is desirable to develop extra whiteness in the pigment, and this may be accomplished by including a small amount of phosphoric acid as one of the reactants. The amount of phosphoric acid used need not exceed a content greater than 1% of the sulphuric acid which is used to react or decompose the calcium silicate. Such phosphoric acid content may be added at the point where calcium silicate itself is introduced as the reactant.

In order to obtain the best results from the standpoint of hiding power, the calcination step requires careful control. If the temperature of calcination is too low decomposition of the sulphate complexes is incomplete and the hiding power is reduced. In addition, the residual sulphuric acid develops undesired reactions in the vehicles in which such a pigment is dispersed. If the calcination temperature is too high, the particle size or the degree of agglomeration of the product is coarsened and the hiding power is again reduced. I have found that a calcination temperature of the order of 830 to 870° C. is an optimum range for development of best hiding power. Under these conditions the sulphate complexes and all excess sulphuric acid are decomposed or fumed off in one to two hours. Under these conditions a particle size in the range of 0.1 to 0.5 micron is developed, and hiding powers of the order of 550 to 580 are made available when the titanium dioxide base material is of the anatase type.

The description foregoing applies equally well to the anatase type as to the rutile type materials. As is available from the prior art rutile type titanium dioxide base pigments may be obtained in preference to the anatase type crystal structure by calcination in the presence of traces of materials containing such agents as potassium oxide, zinc oxide, or antimony oxide. Such variations are included within the present specification. The following examples are indicative of the method of practice:

*Example 1*

(A) 608 parts by weight of 93% $H_2SO_4$
380 parts by weight of 50% $TiO_2$ ilmenite
60 parts by weight of water Add the acid to the water, and cool to 50° C. or below. Grind the ilmenite to —200 mesh and add to the acid slowly with stirring. Heat the constantly stirred batch to about 165° C.–190° C. whereupon a violently exothermic reaction takes place which proceeds for 3 to 5 minutes. Bake at 180° C. for 15 minutes longer. Cool. Add about 1200 parts of water and stir until solution is complete. Allow to settle overnight, and decant off the clear liquor. During solution and settling, the temperature should be maintained below 70° C. The liquor is then treated with about 100 parts by weight of iron turnings in a removable basket until the solution develops a deep blue-black color. The iron turning residue is then removed.

(B) In a separate container, 336 parts by weight of —200 mesh beneficiated wollastonite is mixed with 1500 parts of water, and 306 parts of 93% $H_2SO_4$ added slowly with stirring. The stirring is continued for 2 hours.

(C) The whole of batch (B) is added slowly with stirring to batch (A), and the mixture thus obtained is heated to 95° C. to 100° C. and maintained at this temperature with continual stirring for 8 hours.

The granular white precipitate obtained is filtered and washed on the filter with 0.1% $H_2SO_4$ solution until substantially free from iron. The filter cake is then calcined at 860° C. until all $SO_3$ fumes have disappeared, or for 2 hours, whichever period is longest. The yield at this point is 760 parts by weight and is equivalent to a complex of $TiO_2$, $CaSO_4$, $SiO_2$ containing 25% $TiO_2$, 52% $CaSO_4$, 23% $SiO_2$ as conveniently referred to the precipitation basis, although of course after the calcination $SO_3$ is gone.

The calcine is pulverized and mixed with an equal weight of water, and after stirring for one hour the slurry is dewatered, and the filter cake dried, pulverized, and bagged.

*Example 2*

Same as Example 1 except that the proportions are different and as follows:

(A) 608 parts by weight of 93% $H_2SO_4$
    380 parts by weight of 50% $TiO_2$ ilmenite
    60 parts by weight of water
    (100 parts by weight of iron turnings)
(B) 112 parts by weight wollastonite ($CaSiO_3$)
    102 parts by weight 93% $H_2SO_4$
    500 parts by weight of water The calcined yield is 380, and is equivalent to a complex of $TiO_2$, $CaSO_4$, $SiO_2$, containing 50% $TiO_2$, 35% $CaSO_4$ and 15% $SiO_2$ as conveniently referred to the precipitation basis, although of course after the calcination $SO_3$ is gone.

*Example 3*

Same as Example 1 except that the proportions are different and are as follows:

(A) 1824 parts by weight of 93% $H_2SO_4$
    1140 parts by weight of 50% $TiO_2$ ilmenite
    180 parts by weight of water
(B) 112 parts by weight wollastonite ($CaSiO_3$)
    102 parts by weight 93% $H_2SO_4$
    500 parts by weight of water The calcined yield is 760 grams, and is equivalent to a $TiO_2$, $CaSO_4$, $SiO_2$ complex containing 75% $TiO_2$, 17.35% $CaSO_4$, and 7.65% $SiO_2$ as conveniently referred to the precipitation basis, although of course after the calcination $SO_3$ is gone.

*Example 4*

(A) Part A of Example 1 is followed. After the solution is reduced with iron, the basic titanium sulphate compound is precipitated by adding 1000 parts of water and heating the solution at 95 to 100° C. for 8 hours. The precipitate is filtered and washed.

(B) The reaction and proportions are according to (B) of Example 1.

(C) The precipitate from (A) above is slurried with an equal volume of water, and the slurries (A) and (B) are mixed, stirred for 1 hour, filtered and washed with a 0.1% $H_2SO_4$ solution until free from iron. The composition and yields of Example 1 are obtained.

*Example 5*

(A) 608 parts by weight of 93% $H_2SO_4$
    380 parts by weight of 50% $TiO_2$ ilmenite
    60 parts by weight of water.

Add the acid to the water, and cool. Grind the ilmenite to −200 mesh and add to the acid slowly with stirring. Heat the batch while stirring, to about 165° C.–190° C. Bake for about 15 minutes after the exothermic reaction takes place. Then cool and add about 1200 parts of water, with stirring, the temperature being maintained below 70° C. Allow to settle overnight, and decant the clear liquor. Then to this add about 100 parts by weight of iron turnings in a removable basket until the solution develops a deep blue-black color. Then remove the iron turnings residue, and add 1000 parts of water and heat the solution at 95 to 100° C. for about 8 hours. Then filter and wash the precipitate.

(B) 112 parts by weight wollastonite ($CaSiO_3$)
    102 parts by weight 93% $H_2SO_4$
    500 parts by weight of water.

The whole of batch (B) is added slowly with stirring to batch (A), and the mixture is heated to 95° C. to 100° C., with continual stirring for about 8 hours. The precipitate is filtered and washed with 0.1% $H_2SO_4$ soution until substantially free from iron, and the precipitate is calcined at about 860° C. until all $SO_3$ fumes have disappeared, or for 2 hours, whichever period is longest.

*Example 6*

(A) 1824 parts by weight of 93% $H_2SO_4$ are added to 180 parts by weight of water. 1140 parts by weight of ilmenite is ground to about −200 mesh and is added to the acid slowly with stirring, and the batch is heated to about 165° C.–190° C., with stirring, and after the exothermic reaction takes place the product is baked at 180° C. for about 15 minutes longer, it is then cooled and water is added with stirring, to solution; and after settling overnight, the temperature being maintained below 70° C., the clear liquor is decanted off, and is treated with iron turnings, and the basic titanium sulphate compound is precipitated by adding about 3000 parts of water and heating at 95 to 100° C. for about 8 hours, and filtering and washing the precipitate.

(B) Wollastonite, 112 parts by weight, is mixed with 500 parts by weight of water, and 102 parts by weight of 93% $H_2SO_4$ are added slowly with stirring, for about 2 hours.

Batch (B) is added slowly with stirring to batch (A) and the mixture is heated to 95° C. to 100° C. with stirring for about 8 hours. The precipitate is filtered and washed with 0.1% $H_2SO_4$ solution until substantially free from iron, and the precipitate is calcined at about 860° C. until $SO_3$ fumes have disappeared.

*Example 7*

Part (A) of Example 4 is followed. The basic titanium sulphate precipitate is slurried with 1500 parts of water and 336 parts of −200 mesh $CaSiO_3$ are added. 306 parts by weight of 93% $H_2SO_4$ are then added slowly with stirring, and the stirring continued for 2 hours. The batch is filtered, washed with 0.1% $H_2SO_4$ and calcined at 860° C. as before. The composition and yields of Example 1 are obtained.

*Example 8*

Ilmenite, 380 parts by weight, is stirred into 608 parts by weight of 93% $H_2SO_4$ and 60 parts by weight of water, and the batch is heated to about 165° C.–190° C., and after the exothermic reaction takes place it is baked at about 180° C. for 15 minutes, and after cooling water is added, with stirring, to complete solution. After settling overnight, and decanting off the clear liquor, the latter is treated with iron turnings. The basic titanium sulphate is precipitated by adding water and heating the solution at 95 to 100° C. for about 8 hours. The precipitate is filtered and washed, and is slurried with water, and 112 parts of —200 mesh CaSiO₃ are added. Then 102 parts by weight of 93% H₂SO₄ are added slowly with stirring, for about 2 hours. The batch is filtered, is washed with 0.1% H₂SO₃ and is calcined at about 860° C.

Example 9

Ilmenite, 1140 parts by weight, is added to 1824 parts by weight of 93% H₂SO₄ and 180 parts by weight of water, slowly with stirring, and heating to about 165° C.–190° C., and after the exothermic reaction has taken place, the material is heated at 180° C. for 15 minutes longer and is cooled, and mixed with water to complete solution. The temperature being maintained below 70° C., the solution is allowed to settle overnight and is decanted, and is treated with iron turnings. The basic titanium sulphate compound is precipitated by adding water and heating at 95–100° C. for about 8 hours. The basic titanium sulphate precipitate is slurried with water, and 112 parts by weight of wollastonite are added, then 102 parts by weight of 93% H₂SO₄ are added with stirring, for about 2 hours. The batch is filtered, washed with 0.1% H₂SO₄ and calcined at about 860° C.

Example 10

(A) 160 parts by weight of basic titanium sulphate of formula TiOSO₄ are mixed with 116 parts of wollastonite. This mixture is ground dry in a ball mill until the product will pass a 325 mesh screen. It is then calcined at 860° C. as before, and 270 parts of product are obtained which is a complex equivalent to 29% TiO₂, 22% SiO₂, and 49% CaSO₄ as conveniently referred to the precipitation basis, although of course after the calcination SO₃ is gone.

(B) Same as (A) in the foregoing paragraph except that the mixture is ground wet, dewatered, and then calcined. The yield and composition are the same as in (A).

Example 11

403 parts of Ti(SO₄)₂, 9H₂O are dissolved in 1000 parts of water. 116 parts of —200 mesh wollastonite are added, and the batch is heated to 95° C. with stirring, and is maintained at this latter temperature for 2 hours. The white precipitate is filtered, washed, dried, and calcined as before. The composition and yield of Example 10 is obtained.

Example 12

The same as Example 11, except that 232 parts of wollastonite are used. The calcined yield is 472 parts of composition equivalent to 17% TiO₂, 58% CaSO₄, and 25% SiO₂ as conveniently referred to the precipitation basis, although of course after the calcination SO₃ is gone.

(NOTE.—The advantages of Examples 10 and 12 are that no SO₃ from added sulphuric acid is involved in the calcination.)

Example 13

An excess of CaSiO₃ may be used in Examples 10 and 12 so that precipitation takes place on a base of undecomposed CaSiO₃.

Example 14

When extra whiteness is desired, phosphoric acid is added in small quantities in amounts not more than 1% of the sulphuric acid which is used to react with the CaSiO₃ or wollastonite. Thus in Example 1, 3 parts by weight of 85% H₃PO₄ are added with the H₂SO₄ in (B); 1 part of 85% H₃PO₄ is added with the H₂SO₄ in (B) of Example 2, and in (B) of Example 3. The same general procedure may be followed in Examples 4, 5 and 6. And the same relative amounts of H₃PO₄ may be added in Examples 7, 8 and 9. 2 grams of 85% H₃PO₄ may be added to the reactants in Examples 10 and 11, and 4 grams in the case of Example 12.

In the precipitation—

$$CaSiO_3 + H_2SO_4 + 2H_2O \rightarrow CaSO_4 \cdot 2H_2O + H_2SiO_3$$

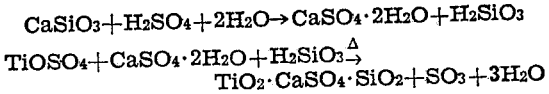

$$TiOSO_4 + CaSO_4 \cdot 2H_2O + H_2SiO_3 \xrightarrow{\Delta}$$
$$TiO_2 \cdot CaSO_4 \cdot SiO_2 + SO_3 + 3H_2O$$

In the calcination—

$$TiO_2 \cdot CaSO_4 \cdot SiO_2 \xrightarrow{\Delta} TiO_2 \cdot CaO \cdot SiO_2 + SO_3$$

In using the titanium sulphate direct—

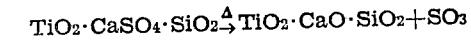

$$TiOSO_4 + CaSiO_3 \xrightarrow{\Delta} TiO_2 \cdot CaO \cdot SiO_2 + SO_3$$

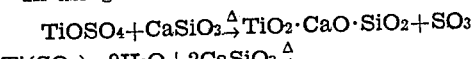

$$Ti(SO_4)_2 \cdot 9H_2O + 2CaSiO_3 \xrightarrow{\Delta}$$
$$TiO_2 \cdot 2CaO \cdot 2SiO_2 + 2SO_3 + 9H_2O$$

In all cases, both precipitate and calcine, the characteristic relation between Ca and Si is the equimolar proportion.

Other modes of applying the principle of the invention may be employed, change being made as regards the detail described, provided the features stated in any of the following claims, or the equivalent of such, be employed.

I therefore particularly point out and distinctly claim as my invention:

1. A process of making a TiO₂—SiO₂ containing pigment which includes the steps of reacting a sulphate of titanium with a calcium silicate containing material wherein the molar ratio of calcium to silicon is 1:1, and calcining the resultant product at a temperature of at least 830° C. and not over 870° C.

2. A process as set forth in claim 1 wherein said sulphate is TiOSO₄.

3. A process of making TiO₂—SiO₂ containing pigment which includes the step of dissolving a titanium dioxide containing material in sulphuric acid to form a solution and then treating said solution with iron, dissolving a calcium silicate containing material in sulphuric acid to form a solution, and then slowly stirring the first solution into the calcium silicate-sulphuric acid solution and heating from a temperature of about 95° C. to about 100° C. for a period of several hours, said calcium silicate containing material containing calcium and silicon in an equimolecular ratio, washing the resulting precipitate, drying, and calcining the dried precipitate at a temperature of at least 830° C. and not over 870° C.

4. A pigment consisting of a calcined complex as produced by procedure in accordance with claim 1, and having its TiO₂ content from about 17 per cent to about 75 per cent of the total weight of the pigment.

References Cited in the file of this patent

UNITED STATES PATENTS

| Number | Name | Date |
|---|---|---|
| Re. 16,956 | Blumenfeld | Aug. 12, 1924 |
| 1,343,447 | Goldschmidt | June 15, 1920 |
| 1,412,027 | Washburn | Apr. 4, 1922 |
| 1,748,429 | Stephens et al. | Feb. 25, 1930 |
| 2,378,790 | Robertson | June 19, 1945 |
| 2,444,237 | Aagaard et al. | June 29, 1948 |
| 2,549,261 | Sullivan | Apr. 17, 1951 |